Feb. 19, 1935.  C. GOTTWALD  1,991,455
CONDUIT AND CONDUIT SYSTEM
Filed Feb. 27, 1931   3 Sheets-Sheet 1
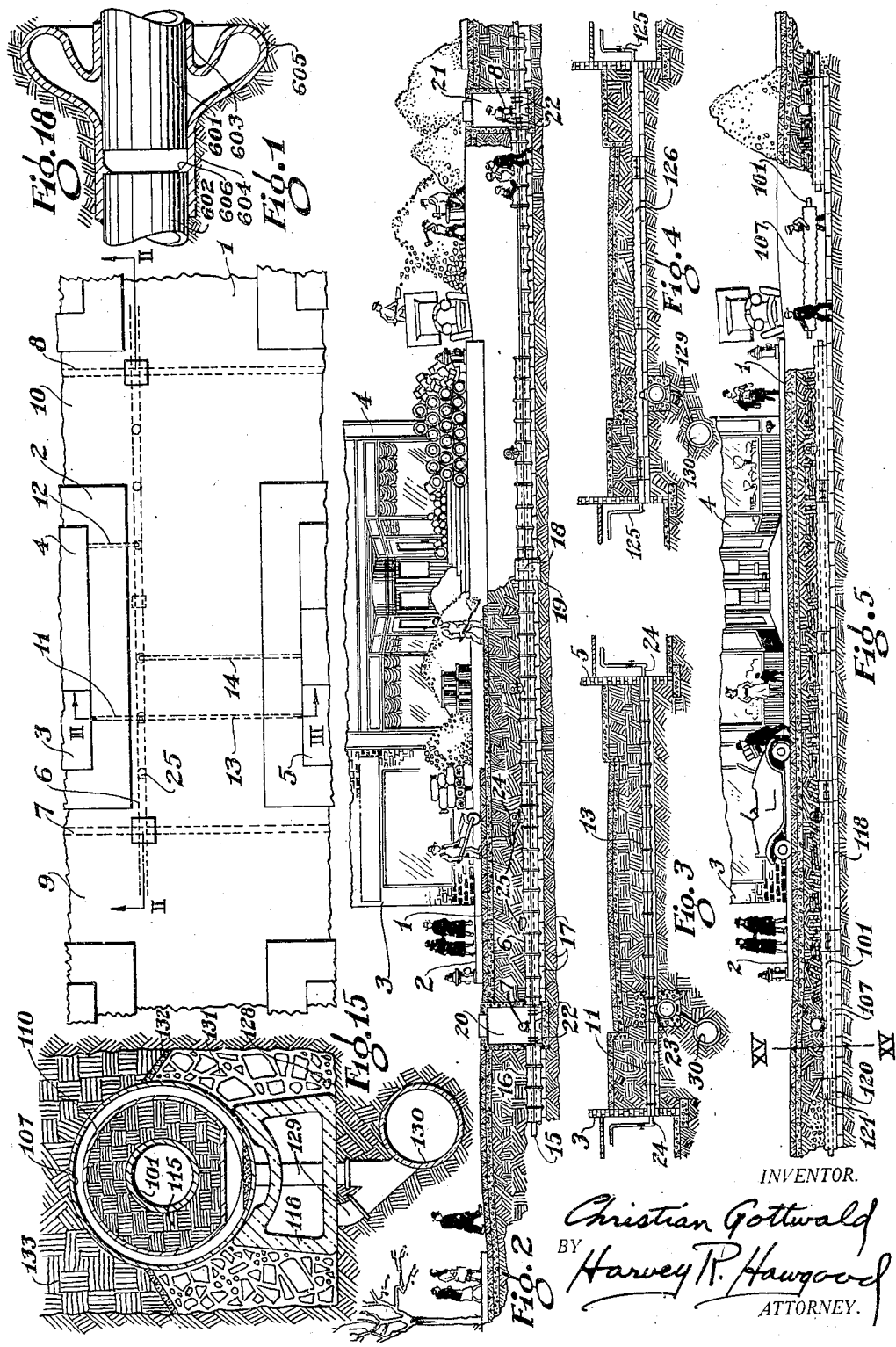
INVENTOR.
Christian Gottwald
BY Harvey R. Hawgood
ATTORNEY.

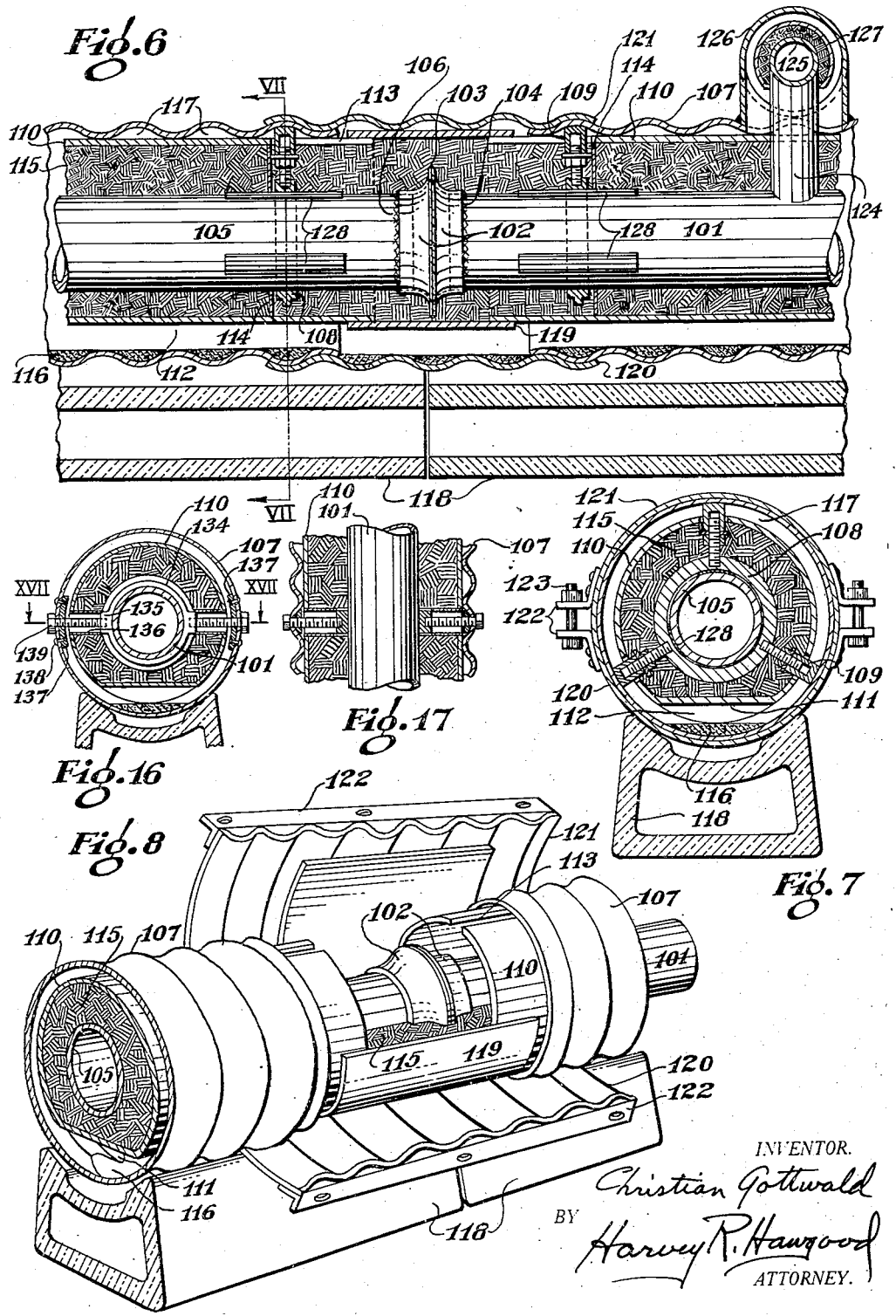

Feb. 19, 1935.    C. GOTTWALD    1,991,455
CONDUIT AND CONDUIT SYSTEM
Filed Feb. 27, 1931    3 Sheets-Sheet 3

INVENTOR.
Christian Gottwald
BY Harvey R. Hawgood
ATTORNEY.

Patented Feb. 19, 1935

1,991,455

UNITED STATES PATENT OFFICE 1,991,455

CONDUIT AND CONDUIT SYSTEM

Christian Gottwald, Cleveland Heights, Ohio, assignor to The Ric-wiL Company, Cleveland, Ohio, a corporation of Ohio Application February 27, 1931, Serial No. 518,749

18 Claims. (Cl. 137—75)

This invention relates to conduits and conduit systems. The apparatus to which it relates is particularly adapted to use in the transmission of steam and other fluids.

Heretofore, in the construction of subterranean steam or similar lines, it has been common to excavate trenches in which the lines are to be positioned, to place in the bottom of the trenches a drainage system frequently consisting of a series of tiles or the like, after which the steam pipe consisting of metal pipe or tubing was placed in position within the trench and enclosed within an outer sheath or casing, which sometimes took the form of a masonry structure composed of brick, hollow tiles or the like, or a box made of concrete slabs, or a combination of several of these materials, and, more recently, semi-circular sections of vitreous tile. The pipe or tubing was frequently provided with a covering of heat insulating material, and after this had been done and the casing completed, the trench was filled in.

It was necessary to provide supports for the steam pipe which would allow the same to move as it expanded. These supports frequently included rollers upon which the pipe rested, and, after being installed, sometimes such mechanisms rusted and became inoperative.

These types of systems possessed certain advantages, in that it was possible to effectively heat-insulate the pipe and protect it from external moisture and the like. They have also possessed certain disadvantages, in that the labor necessary to install them was excessive, as large trenches had to be dug, skilled masons or bricklayers employed in the constructing of the outer casing, and, when finished, this casing, being rigid and of brittle material, was subject to damage by excessivve shocks from above.

Also, due to temperature variation, there was considerable expansion in both the steam pipe and the casing to be provided for, which necessitated the installation at frequent intervals of manholes or the like, in which expansion joints for the steam pipe could be situated, and in the walls of which the ends of the casing could be loosely received. These manholes were necessarily large enough to accommodate a man and permit the adjustment and repacking of the expansion joints and the care of the packing material surrounding the ends of the casing which extended through the walls. Frequently, it was necessary, for the sake of ventilation or escape in the event of damage to the steam pipe, to provide double manholes with communicating doors between them, which manholes, of course, required additional excavation, sides built of masonry or similar material, and, in addition, considerable labor was involved in maintaining the expansion joints and the joints between the casing and the manhole walls in properly packed condition.

The work of installing a casing was slow and laborious and hence disrupted traffic for considerable periods of time. The great quantity and variety of materials necessary encumbered the paving and adjacent sidewalks, and the installation necessitated the use of several different types of skilled labor.

Another disadvantage was that while the steam pipe itself, of course, was anchored intermediate expansion joints, outlets or connections extending therefrom, particularly those remote from the anchorage, would be moved back and forth laterally by expansion, producing wear, tendency to leakage and other undesirable results.

An object of my invention is to produce an improved conduit system which will eliminate the disadvantages attendant prior types.

Another object of my invention is to provide an improved conduit in which a large proportion of the work necessary may be done in a shop, or at some other point remote from the installation, so that this work may be more efficiently carried on, and will not impede the work of installing the system.

Another object of my invention is to provide an improved conduit system which will be made almost entirely of one kind of material and, therefore, may be installed by a single type of skilled labor.

Another object is to provide an improved conduit system which will not require inclosed moving parts.

Another object is to provide an improved conduit system in which both the steam pipe and outer casing may be readily rendered watertight.

Another object is to provide an improved conduit system which will be flexible and capable of taking up both longitudinal and transverse stresses.

Another object is to provide an improved conduit system which will be economical in manufacture, installation and operation.

Other objects will hereinafter appear.

The invention will be better understood from the description of several practical embodiments thereof, illustrated in the accompanying drawings, in which;

Figure 1 is a plan view of a section of a city street showing the arrangements of conduits therein;

Figure 2 is a longitudinal sectional view taken on the line II—II of Figure 1, showing the arrangement of parts in an installation of a prior type;

Figure 3 is a transverse sectional view taken on the line III—III of Figures 1 and 2;

Figure 4 is a view similar to Figure 2 showing an installation embodying my invention applied to the same section of street as that of the first three figures;

Figure 5 is a transverse sectional view taken on the line V—V of Figure 4;

Figure 6 is an enlarged fragmentary longitudinal section of a part of the system of Figures 4 and 5;

Figure 7 is a cross-sectional view taken on the line VII—VII of Figure 6;

Figure 8 is a fragmentary perspective view of parts shown in Figures 6 and 7, illustrating the manner in which the sections are assembled;

Figure 15 is an enlarged cross-section of the conduit and trench in which it is installed;

Figures 16 and 17 are, respectively, fragmentary cross- and longitudinal sectional views of a central portion of a unit showing one form of anchoring means; and Figure 18 is a fragmentary longitudinal sectional view of a modified form of expansion joint.

Figure 9:
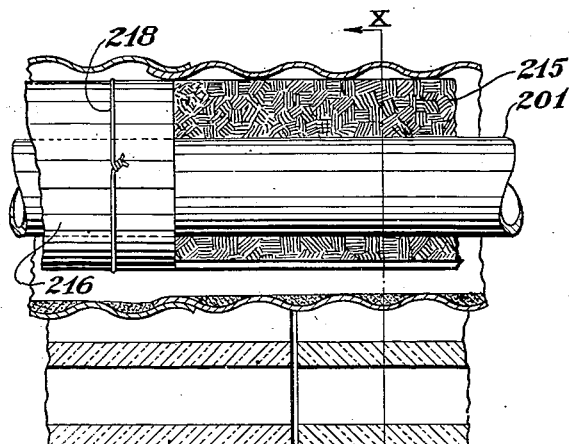
Figure 9 is a view similar to Figure 6 showing another embodiment of the invention.

Referring first to the installation of Figures 1, 2 and 3, a section of a city street is shown consisting of a paving 1, bordered by sidewalks 2 adjacent to which are buildings 3, 4 and 5, and extending along beneath the pavement adjacent one side of the same is a main steam conduit line indicated generally at 6, with which are connected branch mains 7 and 8 extending down side-streets 9 and 10, and also service connections 11, 12, 13 and 14 extending into the buildings along the street.

The installation shown in these figures is one using a ceramic tile casing which is one of the most efficient types of prior constructions, requiring far less brick work or masonry than do most of the prior systems, and being much stronger, more compact and more nearly water-tight than most of the systems now in use. It is, therefore, described as presenting prior constructions in their most favorable light.

The steam lines consist of inner pipes 15 which are encased within semi-cylindrical sections 16 of vitreous tile or the like, the tiles being supported in cradle-like drainage bases 17 also composed of vitreous tile. The pipes 15 rest upon rollers carried by metal brackets which extend into the casing through holes in the bottoms of sections 16, the brackets being supported by the base tiles. At an intermediate point, the main is provided with an anchor which consists of a metal strap 18 welded to the steam pipe and having its ends embedded in a concrete block 19. The ends of the main adjacent the corners of the block enter manholes 20 and 21 where they are provided with slip joints 22 for allowing for the expansion and contraction of the pipe between the anchor and the manhole.

Where service connections are made, special tile sections are employed having upwardly directed openings 23, through which the service pipes 24 may extend, such pipes being illustrated in connections 11 to 14, while at 25 openings are shown which have been provided for service pipes which may be connected at some future date, the openings of the tiles being enclosed with caps or covers. These openings must be provided during the original installation, as it is practically impossible to cut them later without breaking the tile.

In installing the conduit above described, a trench is dug along the street, the manholes are excavated, and walls of brick or masonry built about them. The supporting drains or cradles are laid along the trench, and the lower halves of the split tile sections are next laid upon these cradles, spaced pipe supports being positioned in these sections. After this, the steam pipe itself is positioned upon the supports, this being supported by rollers or bearings, as for instance those shown in my prior Patent Number 1,594,364. Next, the pipe is surrounded with heat insulating material such as asbestos fiber, magnesium or the like; the upper halves of the tiles are placed in position upon the lower halves, the service lines connected, after which it is necessary to seal the joints between successive tiles and along the sides of the halves of each tile section by a suitable cement. The service lines are completed to the buildings and the trenches filled in.

The steam pipes are connected to the expansion joints within the manholes, and the space around the ends of the tile sections, where these pass through the walls of the manholes, are filled with okum or similar fibrous packing material.

The cross-mains are connected to the main line at the manholes, these likewise being provided with slip joints, anchors, tile coverings and the like, and to them are connected other service outlets for the buildings on the cross streets.

Obviously, in constructing a conduit, such as above described, a great deal of labor is involved, first in excavating not only the trenches which must be relatively large to permit the work of assembling the various parts, but also the space for the manholes; next in constructing the masonry for the manholes, after that in laying the base or cradle sections, splitting the enclosing tiles, and placing the lower halves of these upon the cradles.

The labor involved is not only great, but is of various kinds, as artisans in the metal working trades must be employed in installing the steam pipe itself; while bricklayers, masons and the like must be employed in the building of the manhole walls, the sealing of the tiles, etc., steam fitters are required for the installation of the expansion joints; and in the excavating and handling of materials considerable unskilled labor is required.

A large number of these tiles are required and, being made of ceramic material, they are of large diameter and thickness and are limited to short lengths, generally in the neighborhood of two feet. They are heavy and cumbersome to handle and relatively fragile. Also, as deformation takes place in the firing of these ceramic tiles, it is necessary to form them as complete cylinders and split the halves apart on the job, so that the two halves which were originally formed integrally will be placed together in the finished structure.

After the lower halves of the tiles have been laid, the sections of the steam pipe itself must be placed, joined together, and connected to the slip joints within the manholes. Next, the space around the steam pipe within the tile must be filled with insulating material, each of the upper tile sections then being properly placed upon its corresponding lower tile sections, and the joints along the sides and at the ends of the tile sealed. It is also necessary to provide outlets for any service connections which may be required both immediately and in the future, and providing such of these as are for future use with suitable caps.

Not only must materials of different natures be used, but these, of course, possess different co-efficients of expansion and different characteristics. The finished structure is extremely rigid and brittle and hence very difficult to be made and kept water-tight.

With the improved type of construction illustrated in Figures 4 to 8, a much more compact type of conduit is used which may be almost entirely fabricated at a shop or other remote point, and conveniently assembled on the job. This conduit consists of relatively long sections of steel tubing or other steam pipe, each of which is encased in an outer tubular shell or covering and has interposed between the pipe and shell a layer of heat insulating material, so that it is only necessary to lower a few of these sections upon the base tiles which have been laid within the trench, unite the ends of the pipes, surround the joints so formed with heat insulating material, and fill in the trench.

The sections are also shown as provided with expansion joints, each joint being capable of taking up the entire possible expansion in the section to which it is connected, so that no necessity for slip joints or the like exists, and, therefore, it is unnecessary to provide manholes for such joints.

As most clearly shown in Figures 6 to 8, a conduit section comprises a steam pipe or tubing 101, this being provided at one end with a sleeve or ferrule shown as formed of two generally frustro-conical-shaped pieces 102 with their outer edges or flanges secured together by welding 103, and welded to the steam tubing at 104. The sleeve or ferrule may, if desired, be provided with one or more annular corrugations or the like, to render it more flexible. The other end of the sleeve is adapted to receive the end of the next succeeding section of tubing 105, and is welded thereto upon installation as indicated at 106. Surrounding the tubing is a metal shell or casing 107 shown as formed with a plurality of circumferential corrugations, and the tubing is held in substantially central relation to the shell by means of two spiders, one adjacent each end of the casing, each consisting of a central ring-like portion 108 which surrounds the tubing and a plurality of adjustable arms 109 which are adjusted outwardly to seat within the bottom of one of the corrugations. A liner 110 of sheet metal or the like is provided within the shell or casing, this liner being generally circular in cross-section, but being flattened or bent inwardly along the bottom thereof, as shown at 111, to provide a drainage passage 112 between it and the bottom of the shell. This liner is conveniently provided with slots 113 extending inwardly from its ends through which the arms of the supporting spider may extend.

Within the liner, and held in place by the spiders, are two washers 114 and the space between these washers is filled with finely divided heat insulating material 115. The corrugations in the bottom of the shell are filled with asphalt 116, cement, or other similar material, so that the bottom of the drainage passage has no depressions in which water can accumulate and remain.

It will be observed that an air space 117 surrounds the liner, being interrupted only where the corrugations and the shell touch each other, this air space not only serving to increase the effectiveness of the heat insulation, but also allowing any water condensing within the shell to readily flow downwardly to the drainage passage.

The sections as above described are manufactured wherever this can most conveniently be done, and are installed by being laid upon a row of tile sub-bases or cradles 118, the sleeves sliding over the ends of adjacent pipe sections and being welded thereto, after which a liner coupling or section 119 of sheet metal and of the same general cross-sectional shape as the liners is partially positioned about the joint, the space enclosed by this coupling and between two adjacent spiders is filled with heat insulating material, and the liner secured in place by any suitable means as bolts, straps, wires, or welding. After this is done, a corrugated coupling, shown as consisting of two semi-circular halves 120 and 121 provided along their side edges with angles 122, is placed about the ends of the two adjacent shells and clamped into position by bolts 123.

While tile sub-bases are shown, obviously in a suitable soil, or if laid above the ground, these would not be required.

If desired, the shell coupling may be welded along its sides and at its ends to the shells themselves to form a watertight enclosure for the joint. This type of construction is desirable in places which may, at times, be submerged.

Wherever it is desired to connect a branch or service line to the main, it is only necessary, with a torch, to cut a hole through the shell and liner and through the tubing therebeneath, after which an upwardly extending piece of tubing 124 is welded to the main pipe and allowed to extend beyond the shell. To the upper end of this tubing, another pipe or tube 125 is connected by welding, this, in turn, being enclosed within a shell 126 and liner 127 similar to those previously described.

Bearing strips 128 of sheet metal are shown as welded to the exterior of the steam pipe, so that any wear due to the sliding of the pipe within the supporting rings 108 caused by expansion and contraction will abrade the metal of the strips and not that of the tubing itself.

In Figure 15 a cross-section of an installed conduit is shown, and from this it will be seen that the tile base 118 is positioned upon the bottom of the trench. Drains 129 extend from the drainage passage 112 and from the space within the tile base to a sewer or the like 130. The space within the trench, up to or possibly slightly above the height of the center of the conduit, is filled with stone or gravel 131 to provide for the easy passage of moisture from about the conduit to within the tile base. A layer of wide mesh fabric material or the like 132 is placed over the stone or gravel to prevent the infiltration of dirt, which would impair the drainage qualities of the former, and the trench about this point is filled with soil.

In Figures 16 and 17 a central portion of the conduit is shown, and anchoring means illustrated which consists of a ring 134 which surrounds the pipe 101 and is secured thereto as by welding.

This ring is provided with two recessed bosses 135 to which are secured tubular guards 136 extending outwardly through the liner 110.

Two arcuate shoes 137 are secured within the corrugations and the shell 107 as by rivets 138, and the shell and shoes are perforated and the latter threaded for the reception of screws 139. These screws pass inwardly within the tubular members 136 and enter the recesses in bosses 135 and so prevent the pipe 101 from moving axially within the casing at the point of anchorage. The screws may be readily inserted after the pipe has been inserted within the shell and may be readily removed to permit disassembling. With the pipe so anchored to the shell, it is unnecessary to provide anchorage means such as the concrete block used in installation of Figures 1 to 3, as, not only are the shells not subject to great temperature changes and, therefore, not inclined to be displaced, but, due to the roughened exterior, the earth packed about the shells anchors them quite securely. Of course, the anchorage means might be afforded at one end of each pipe section as by welding ring 108 thereto, but I prefer to anchor the pipe near its center, so that the expansion will be about equal at the ends.

Figure 10:
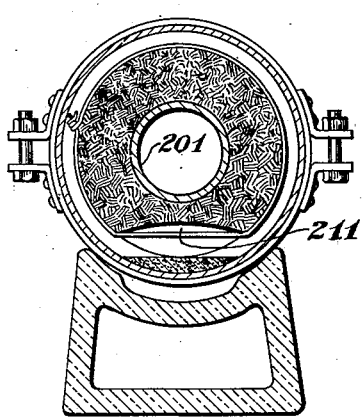
Figure 10 is a cross-sectional view taken on the line X—X of Figure 9.

In the embodiment illustrated in Figures 9 and 10, a solid heat insulating material 215 has been substituted for the finely divided material above described, this being formed into a hollow cylinder with a recess 211 at its lower side, to provide the drainage passage required. As the solid material will itself support the pipe, the use of the spiders, washers and liner is eliminated. Semi-cylindrical blocks 216 and 217 surround the pipe joints and are secured in place as by a wire 218.

Figure 11:
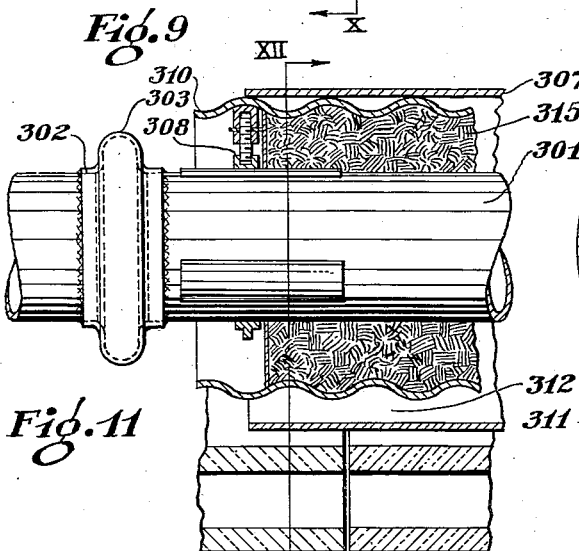
Figure 11 is a fragmentary longitudinal sectional view of another embodiment of the invention.
Figure 12:
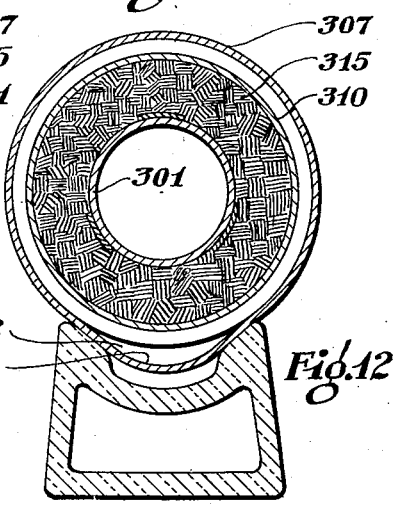
Figure 12 is a cross-sectional view taken on the line XII—XII of Figure 11.

In Figures 11 and 12 a plain shell 307 is used with a corrugated liner 310. In this case, the liner is circular in cross-section and the shell has a depression 311 running along its bottom to constitute the drainage trough 312. The pipe is supported by spiders 308, and finely divided insulating material 315, as in the embodiment first described, fills the space between the steam pipe and liner. By the transferring of the corrugations to the liner instead of the shell, it is obvious that no paving will be required. The pipe coupling sleeve shown in these figures consists of a single tubular piece 302, which, intermediate its ends, is formed into an outwardly extending annular rib 303 which functions to compensate for expansion and contraction, as do the conical flanges of the form of Figures 6 to 8.

Figure 13:
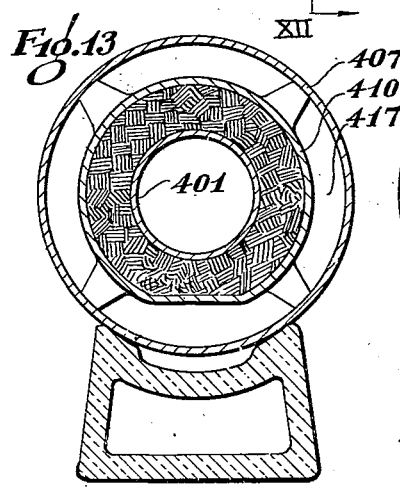
Figures 13 and 14 are fragmentary cross-sectional views of two other embodiments of the invention.

Figure 13 illustrates an embodiment in which a circular tubular shell 407 has within it a non-circular tubular liner 410 provided with outwardly struck lugs 411 which hold it in spaced relation, with an air space 417 between it and the shell, the pipe 401 being held within the liner by spiders similar to those above described, and the space between the spiders filled with finely divided insulating material.

Figure 14:
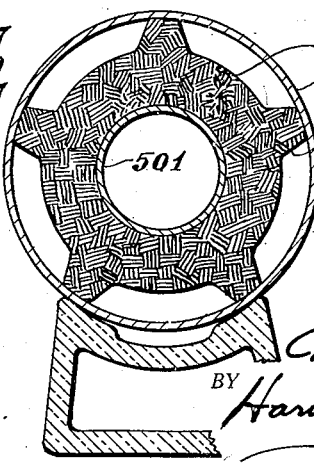

Figure 14 shows an embodiment in which solid insulating material 515 is used within a tubular shell 507, this insulation being provided with lugs 511 by which it is held spaced from the shell, there being no spiders or liner required.

Figure 18 illustrates a variation of the pipe coupling sleeve or ferrule carried by the end of pipe section 601 and adapted to receive adjacent pipe section 602. This ferrule has a short cylindrical end 603 welded to section 601 and a longer cylindrical end 604 adapted to be welded to section 602. The latter cylindrical portion is intended to bridge the gap between the ends of the adjacent pipe sections, so that particles of solid material will be excluded from the annular flexible portion of the ferrule. This portion consists of an obliquely disposed hollow rib 605 which may be corrugated, if desired, to increase the flexibility. Stops 606 prevent the insertion of the pipe sections 602 to a greater distance than that required in effectively joining it to the sleeve and so maintain the proper clearance between the ends of the pipe sections.

While I have described the illustrated embodiments of my invention in some particularity, obviously many other embodiments will readily occur to those skilled in the art to which this appertains, and I, therefore, do not limit myself to the precise details shown and described, but claim as my invention all embodiments, variations and modifications coming within the scope of the subjoined claims.

I claim:

1. A conduit system comprising a plurality of tubular pipe sections arranged end to end, a shell surrounding each pipe section, heat insulating material interposed between said pipe and shell, a liner interposed between the heat insulating material and shell, and means spacing the liner from the shell.

2. A conduit system comprising a plurality of tubular pipe sections arranged end to end, a shell surrounding each pipe section, heat insulating material interposed between said pipe and shell, a liner interposed between the heat insulating material and shell to provide an air space substantially surrounding the liner and a drainage space between the bottom of the liner and the shell.

3. A conduit system comprising a plurality of tubular pipe sections arranged end to end, a shell surrounding each pipe section, heat insulating material interposed between said pipe and shell, a liner interposed between the heat insulating material and shell to provide an air space substantially surrounding the liner, a drainage space between the bottom of the liner and the shell, and a row of hollow cradle-shaped tiles supporting said shells.

4. An article of manufacture comprising a conduit section having an inner fluid conducting tube, an outer shell, spacing means interposed between the tube and shell, and a liner between the tube and shell and spaced from the latter.

5. An article of manufacture comprising a conduit section having an inner fluid conducting tube, an outer shell, spacing means interposed between the tube and shell, a liner between the tube and shell and spaced from the bottom of the latter, and insulating material interposed between the tube and the liner.

6. An article of manufacture comprising a conduit section having an inner fluid conducting tube, an outer circular corrugated shell, a cylindrical liner within the shell engaging the corrugations at the sides and top thereof but spaced therefrom at the bottom, spacing means holding the tube in axial alinement with the shell and liner but spaced therefrom, heat insulating material filling the space between the tube and liner, and paving material filling the depressions in the bottom of the shell.

7. An article of manufacture comprising a conduit section having an inner fluid conducting tube, an outer shell of generally cylindrical shape and non-circular cross-section, a liner within the shell of circular cross-section, projections on the liner engaging the shell and spacing the liner and shell apart throughout the majority of their extent, heat insulating material between the liner and tube, the difference in cross-section of the liner and shell providing a drainage passage along the bottom of the unit.

8. An article of manufacture comprising a conduit section having an inner fluid conducting tube, an outer shell of general cylindrical shape and non-circular cross-section, a corrugated liner within the shell of circular cross-section, the corrugations on the liner engaging the shell and spacing the liner and shell apart throughout the majority of their extent, heat insulating material between the liner and tube, the difference in cross-section of the liner and shell providing a drainage passage along the bottom of the unit.

9. An article of manufacture comprising a conduit section having an inner fluid conducting tube, an outer shell, a liner within the shell spaced therefrom through the majority of its extent, blocks of solid heat insulating material surrounding the tube and filling the liner at the ends of the section, and finely divided heat insulating material filling the space between the liner and shell.

10. An article of manufacture comprising a conduit section having an inner fluid conducting tube, an outer cylindrical shell, form sustaining heat insulating material surrounding said tube and spaced from the bottom of the shell to provide a drainage passage, projections on said insulating material engaging said shell, and spacing the insulating material therefrom.

11. An article of manufacture comprising a conduit unit having an inner integral fluid conducting tube, heat insulating material surrounding said tube nearly to its ends, and a covering surrounding said heat insulating material and extending nearly to the ends of said tube.

12. An article of manufacture comprising a conduit unit having an inner fluid conducting tube, an outer cylindrical corrugated shell, and heat insulating material between the tube and shell, the heat insulating material and shell being slightly shorter than the fluid conducting tube.

13. An article of manufacture comprising a conduit unit having an inner fluid conducting tube, an outer cylindrical corrugated shell, spacing means within the shell retaining the tube in substantially axial alignment therein, and heat insulating material between the tube and shell, the heat insulating material and shell being slightly shorter than the fluid conducting tube.

14. An article of manufacture comprising a conduit unit consisting of two telescopically arranged tubes, the inner being a fluid conducting tube and the outer a casing, and heat insulating material interposed between the tubes and arranged to leave a longitudinally extending space throughout the casing.

15. An article of manufacture comprising a conduit unit consisting of two telescopically arranged tubes, the inner being a fluid conducting tube and the outer a casing, and form sustaining heat insulating material interposed between the tubes and arranged to leave a longitudinally extending space throughout the casing.

16. A conduit system comprising a plurality of units each consisting of a fluid conducting pipe, surrounded by heat insulating material, the heat insulating material being secured to the pipe so that the two may be handled and installed together, and extending nearly to the ends of the pipe, the adjacent ends of the pipes of successive units being joined, and heat insulating material secured about the joints so formed.

17. A conduit system comprising a plurality of units each consisting of a fluid conducting pipe, surrounded by heat insulating material, the heat insulating material being secured to the pipe so that the two may be handled and installed together and extending nearly to the ends of the pipe, a metallic protective cover surrounding said heat insulating material and likewise extending almost to the ends of the pipe, the adjacent ends of the pipes of successive units being joined, heat insulating material secured about the joints so formed, and additional coverings surrounding said last mentioned heat insulating material and overlapping the ends of said first mentioned protective covering.

18. An article of manufacture comprising a conduit unit consisting of two telescopically arranged tubes, heat insulating material interposed between the tubes and arranged to leave between the tubes a longitudinally extending passage between them and peripherally extending passages communicating with the longitudinally extending passage.

C. GOTTWALD.

DISCLAIMER 1,991,455.—*Christian Gottwald*, Cleveland Heights, Ohio. CONDUIT AND CONDUIT SYSTEM. Patent dated February 19, 1935. Disclaimer filed April 16, 1935, by the assignee, *The Ric-wiL Company*.

They therefore, in compliance with R. S. 4917; 35 U. S. C. 65, severally and jointly enter this disclaimer as follows:

They disclaim from claim number 11 any unit in which a central tube and outer covering are hermetically sealed together at both ends of the covering and intermediate the ends of the central tube to provide an hermetically sealed jacket about a portion of said central tube.

[*Official Gazette May 7, 1935.*]